US009021109B1

(12) United States Patent
Gigliotti et al.

(10) Patent No.: US 9,021,109 B1
(45) Date of Patent: Apr. 28, 2015

(54) CONTROLLING REQUESTS THROUGH MESSAGE HEADERS

(75) Inventors: Samuel S. Gigliotti, Seattle, WA (US); Matthew E Goldberg, Seattle, WA (US); Jonathan W Keljo, Seattle, WA (US); Benjamin L Sauer, Tukwila, WA (US)

(73) Assignee: Amazon Technologies, Inc., Reno, NV (US)

( * ) Notice: Subject to any disclaimer, the term of this patent is extended or adjusted under 35 U.S.C. 154(b) by 611 days.

(21) Appl. No.: 13/356,474

(22) Filed: Jan. 23, 2012

(51) Int. Cl.
*G06F 15/173* (2006.01)
*H04L 29/08* (2006.01)
*H04N 21/443* (2011.01)
*G06F 3/00* (2006.01)

(52) U.S. Cl.
CPC ............ *H04N 21/4431* (2013.01); *H04L 67/14* (2013.01)

(58) Field of Classification Search
CPC ......... H04L 69/28; H04L 1/18; H04L 1/1803; H04L 67/14; H04L 67/02; H04N 21/4431
USPC ................. 709/203, 217–219, 225, 227–229; 719/313
See application file for complete search history.

(56) References Cited

U.S. PATENT DOCUMENTS

| | | | | |
|---|---|---|---|---|
| 6,938,257 | B1 * | 8/2005 | Rapp et al. | 719/311 |
| 7,653,679 | B2 * | 1/2010 | Kantor et al. | 709/201 |
| 8,051,145 | B2 * | 11/2011 | Wu et al. | 709/219 |
| 8,417,817 | B1 * | 4/2013 | Jacobs | 709/226 |
| 8,566,390 | B2 * | 10/2013 | Saillet et al. | 709/203 |
| 2007/0150605 | A1 * | 6/2007 | Christoffersson et al. | 709/228 |
| 2008/0243996 | A1 * | 10/2008 | Wu et al. | 709/203 |
| 2009/0287842 | A1 * | 11/2009 | Plamondon | 709/233 |
| 2010/0083045 | A1 * | 4/2010 | Qiu et al. | 714/27 |
| 2010/0115061 | A1 * | 5/2010 | Tai et al. | 709/219 |
| 2012/0030326 | A1 * | 2/2012 | Cassidy et al. | 709/223 |
| 2013/0060887 | A1 * | 3/2013 | Bradnick et al. | 709/217 |
| 2013/0332516 | A1 * | 12/2013 | Shah | 709/203 |
| 2014/0010090 | A1 * | 1/2014 | Xiao | 370/242 |
| 2014/0013007 | A1 * | 1/2014 | Nemoto et al. | 709/247 |
| 2014/0082186 | A1 * | 3/2014 | Sasmita et al. | 709/224 |
| 2014/0146671 | A1 * | 5/2014 | Diachina et al. | 370/230 |

* cited by examiner

*Primary Examiner* — Alina N Boutah
(74) *Attorney, Agent, or Firm* — Lee & Hayes, PLLC

(57) ABSTRACT

In some implementations, in response to receiving a request message from a client device, a computing device may provide a response message that includes a custom or non-standard control header. The control header may instruct the client device to wait before sending any subsequent request messages to the computing device. For example, the control header may inform the client device to wait until passage of period of time or until after a specified time arrives before sending a subsequent request message. A module, an application, an operating system, or other software on the client device that receives the response message, interprets the control header and performs one or more operations to comply with the control header. Accordingly, some implementations herein utilize message headers to perform message throttling for controlling an amount of network traffic or load on one or more computing devices.

25 Claims, 7 Drawing Sheets

CONTROLLING REQUESTS THROUGH MESSAGE HEADERS

BACKGROUND

Two computing devices may exchange data or other information over a communication network using a messaging protocol. For instance, a computing device may send a request message to another computing device over the communication network. The other computing device may send a response message back over the communication network to the first computing device in reply to the request message. However, when this messaging model is increased in scale, complications may occur. For example, a large number of computing devices may send a large number of request messages to a single computing device or to a finite group of computing devices over a short amount of time. This eventuality has the potential to overload the computing device or group of computing devices, which may result in high response latency, timeouts, denial of service, system outages, or other undesirable effects.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Message Headers for Controlling Requests

Figure 1:
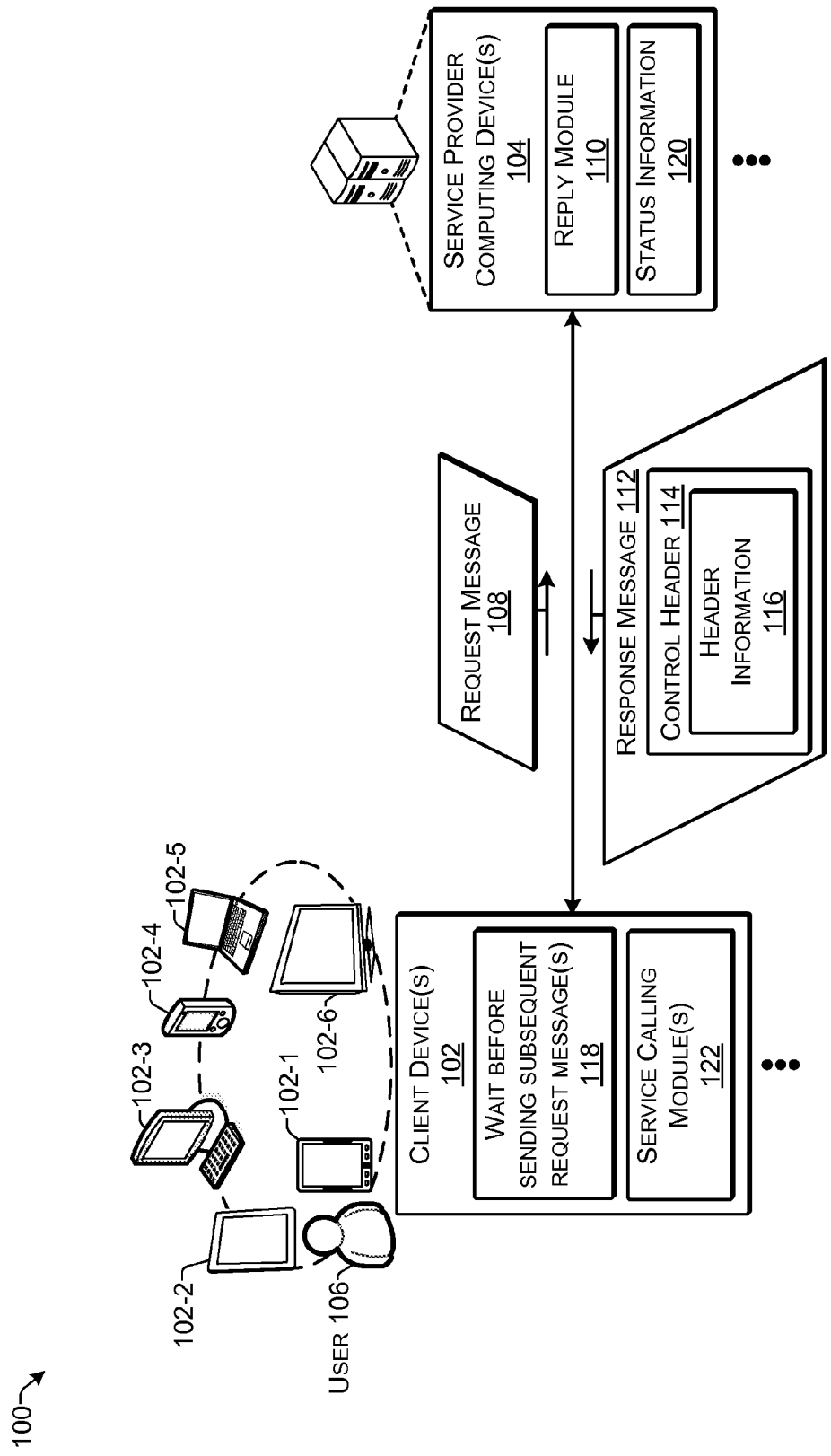
FIG. 1 illustrates an example framework for controlling requests through message headers according to some implementations.

This disclosure includes techniques and arrangements for using message headers to control requests received from computing devices. Message headers typically have a reserved area in the front of a message to provide metadata regarding the message. For instance, a message header may be a portion of a message that typically precedes a content or body portion of the message, and provides identification information regarding the message, possibly descriptive information regarding content included with the message, and so forth. As one example, in hypertext transfer protocol (HTTP), the header includes a text field (e.g., a stream of text) that may be sent with or without any content. HTTP further includes standard headers that are specific to request messages or to response messages, and other standard and non-standard headers that are used by a client and/or server to describe or query the content or the environment.

In some implementations herein, in response to receiving a request message from a client device, a computing device may provide a response message that includes a custom or non-standard control header. The control header may instruct, request or otherwise inform the client device to wait before sending any subsequent request messages to the computing device. For example, the control header may include information that instructs and/or informs the client device to wait for a specified period of time such as a number of seconds, minutes, hours, days etc. Alternatively, the control header may include information that instructs and/or informs the client device to wait until after a specified time, such as after a particular time on a particular day, before sending a subsequent request message. As still another alternative, the control header may include information that instructs and/or informs the client device to never send a subsequent request message. An application programming interface (API), a module, an application, an operating system, or other software on the client device that receives the response message interprets the control header and performs one or more operations to comply with the control header to wait before sending a subsequent request message.

Accordingly, some implementations herein utilize message headers to perform message throttling for controlling an amount of network traffic or load on one or more computing devices. The control headers are utilized to request or inform the device, or a module on the device, to wait before sending a subsequent message. Accordingly, a first request message may be fully responded to by the response message that includes the control header. Thus, the subsequent request message(s) referred to herein that the client device waits to send is not a retry of the first request message, but instead may be one or more subsequent request messages which may or may not be of the same type, may be directed to the same or different subject matter, may be directed to the same or different services, and so forth. For example, the control header may be used to instruct or inform a particular module that uses a particular API to wait before sending a subsequent request message. Thus, other modules on the client device may continue to send request messages while the particular module is waiting in accordance with the information in the control header. As another alternative, a control header may instruct or inform some or all of the modules on a client device to wait before sending subsequent request messages.

As one example, a large number of client devices may include software that periodically contacts a service provider computing device to determine whether new information is available for the particular client device and/or to provide information from the particular client device to the service provider computing device. For instance, to enable a data pull functionality to emulate a data push experience to a user of the client device, the client device may be configured to check for updates to various types of information upon the activation of certain conditions, interfaces, controls or triggers at the client device, such as in response to certain user actions, the passage of a predetermined period of time, or the like. Accordingly, some implementations may automatically and remotely control the frequency with which each client device checks for updates or otherwise sends request messages to computing devices of a service provider to avoid overload on the computing devices of the service provider.

For example, suppose that a particular service calling module on the client device continually calls a particular service provided by a service provider computing device on a periodic basis when the client device is being used in a particular fashion or performing a particular function. When a large number of client devices are continually calling the same service, the service may begin to be overloaded. Accordingly, the service may use control headers to dynamically limit the frequency with which each client device may request a particular service, such as by informing the particular service calling module or other software issuing the request messages to wait before sending another request message. For example, the control header may instruct, request or otherwise inform the software on the client device to not send a subsequent request message to the particular service for a specified period of time or to wait until after a specified time. In certain situations, the control header may inform the software not to send any subsequent request messages to any service provider computing devices for a specified period of time and or until after a specified time.

As another example, it may happen that a software update having a bug is issued by a service provider to a plurality of client devices before the bug is discovered. For instance, the bug may cause the client devices to repeatedly call the service provider computing devices. Thus, until the bug can be corrected the service provider computing devices may be inundated with messages from a large number of client devices. To prevent the service provider computing devices from crashing or otherwise becoming inoperable, the service provider computing devices may issue responses to the messages that include control headers to throttle the number of calls made by each client device. For example, in some cases, the control header may instruct or inform the client devices to wait several hours, several days, or the like, before making a subsequent call to the service provider computing devices so that the service provider computing devices may remain functional while the service provider generates and issues a software update to correct the bug.

In some examples, one or more APIs at the client device may be implemented to send request messages to the service provider computing devices. Accordingly, the control header may be used to control request messages according to a granularity of individual APIs that are used to make calls to or are otherwise used to send request messages to a service provider computing device. Therefore, in some instances, the control header may be directed to controlling a particular API from among multiple APIs employed or implemented by one or more service calling modules on a particular client device. In other words, the control header may be used to limit or throttle the frequency with which the particular API on the client device is used to send messages to the service provider computing devices. Alternatively, the control header may be directed to controlling a subset of APIs used on a particular client device. As still another alternative, the control header may be directed to controlling all of the APIs used on a particular client device.

In some examples, the control header may be a Hypertext Transfer Protocol (HTTP) header. HTTP is one example of a suitable network messaging protocol according to some implementations herein. HTTP allows the use of non-standard or custom header fields. For example, non-standard HTTP headers are typically marked by prefixing the header field name with "X-." Accordingly, in some implementations, the control header herein may be a non-standard HTTP header that is recognized by software executed on the client device. The control header may include a header value or other header information in the header field that instructs or otherwise informs the client device to wait before sending any subsequent request messages.

In some implementations, each service provider computing device that maintains at least one API that is a target of a call from the client device may issue control headers for controlling traffic to the at least one API maintained by the service provider computing device. In other examples, a first service provider computing device may use control headers to manage traffic to a plurality of APIs maintained either at the service provider computing device, or at other service provider computing devices. As another example, in addition to or as an alternative to a control header, information contained in a message body of a response message may inform the client device, or one or more modules thereon to wait before sending a subsequent request message. Furthermore, while some implementations herein are described in the environment of HTTP for discussion purposes, implementations herein are not limited to the examples provided, but may be extended to other environments and protocols for messaging, as will be apparent to those of skill in the art in view of the disclosure herein.

Example Framework

FIG. 1 illustrates an example framework 100 for using message headers to control request messages according to some implementations. The framework 100 includes at least one client device 102 in communication with at least one service provider computing device 104. In the implementations herein, the client device 102 may be any type of computing device capable of communicating with the service provider computing device 104 through a messaging protocol. Several examples of the client device 102 include digital media devices and eBook (electronic book) readers 102-1, tablet computing devices 102-2, desktop or server computing devices 102-3, cellular phones, smart phones and mobile devices 102-4, laptop and netbook computing devices 102-5, televisions, gaming systems and home electronic devices 102-6, and any other device capable of accessing and/or communicating with the service provider computing device 104. In some examples, there may be thousands or millions of client devices 102. Additionally, in some instances, the client device 102 may be associated with one or more users 106.

The client device 102 may send a request message 108 to the service provider computing device 104. For example, an application, an operating system, an application programming interface (API), or other component, module, or functionality on the client device 102 may send the request message 108 to the service provider computing device 104. The request message 108 may request data, content, information, or other resources from the service provider computing device 104. Alternatively, the request message 108 may provide data, content, information, or other resources to the service provider computing device 104.

In response to the request message 108, a reply module 110 on the service provider computing device 104 may send a response message 112 to the client device 102 that sent the request message 108. The response message 112 may include a control header 114 that may provide instructions or control information to the client device 102. For example, the control header 114 may include header information 116 containing information to instruct or inform the client device 102 to wait before sending subsequent request message(s), as indicated at 118.

In some examples, the header information 116 may instruct, request, or inform the client device 102 to wait until after a specified period of time has passed or until after a specified date and time has arrived. Thus, the header information 116 may include an amount of time, e.g., a number of seconds, minutes, hours, days, etc., for the client device 102 to wait before sending a subsequent request message. Alternatively, the header information 116 may include a specified time, date, etc., after which the client device 102 may send a subsequent request message. As one additional example, the header information 116 may be "never" in some cases, i.e., the client device 102 is instructed to never send another request message.

As one example, based on status information 120 relating to one or more conditions of the service provider computing device 104 and/or one or more conditions of one or more other computing devices (not shown in FIG. 1), and/or other current or future conditions, metrics, or parameters, the reply module 110 may determine an appropriate length of time for the client device 102 to wait before sending a subsequent request message. For instance, if the status information 120 indicates that the service provider computing device 104 is currently under a heavy load due to receiving a large number of request messages 108 from a large number of client devices 102, the reply module 110 include the control headers 114 in the response messages 112 provided to the client devices 102. Each control header 114 may instruct or inform the respective client device 102 that receives a response message 112 to wait according to a specified time limit before sending subsequent request messages. For example, the information contained in the control header 114 may apply to the entire client device 102 or may apply to a particular module, application, API or other functionality or messaging component of the client device 102. Thus, the client device 102 may include one or more service calling modules 122 that send the request message 108 and/or receive the response message 112.

The service calling module(s) 122 or other functionality at the client device 102 receives the response message 112 having the control header 114. In response to reading the control header 114, the client device 102, or a particular service calling module 122, an application, an API, software, or other functionality of the client device 102, may wait in accordance with the control header 114 before sending a subsequent request message to the service provider computing device 104. Accordingly, in some examples herein, the service provider computing device 104 may utilize the control headers 114 to manage, throttle, or otherwise control the number of repeated request messages received from client devices 102 in communication with the service provider computing device 104.

For example, client devices 102 may sometimes needlessly send the same request messages 108 over and over as a result of user interactions or other conditions at the client device. Consequently, if the service provider computing device 104 is currently under a heavy load, in a brownout condition, or suffering from high latency times when responding to request messages 108, the service provider computing device 104 may limit or throttle the number of subsequent request messages that can be issued by the client devices 102. Numerous other variations will be apparent to those of skill in the art in light of the disclosure herein.

Example Architecture

Figure 2:
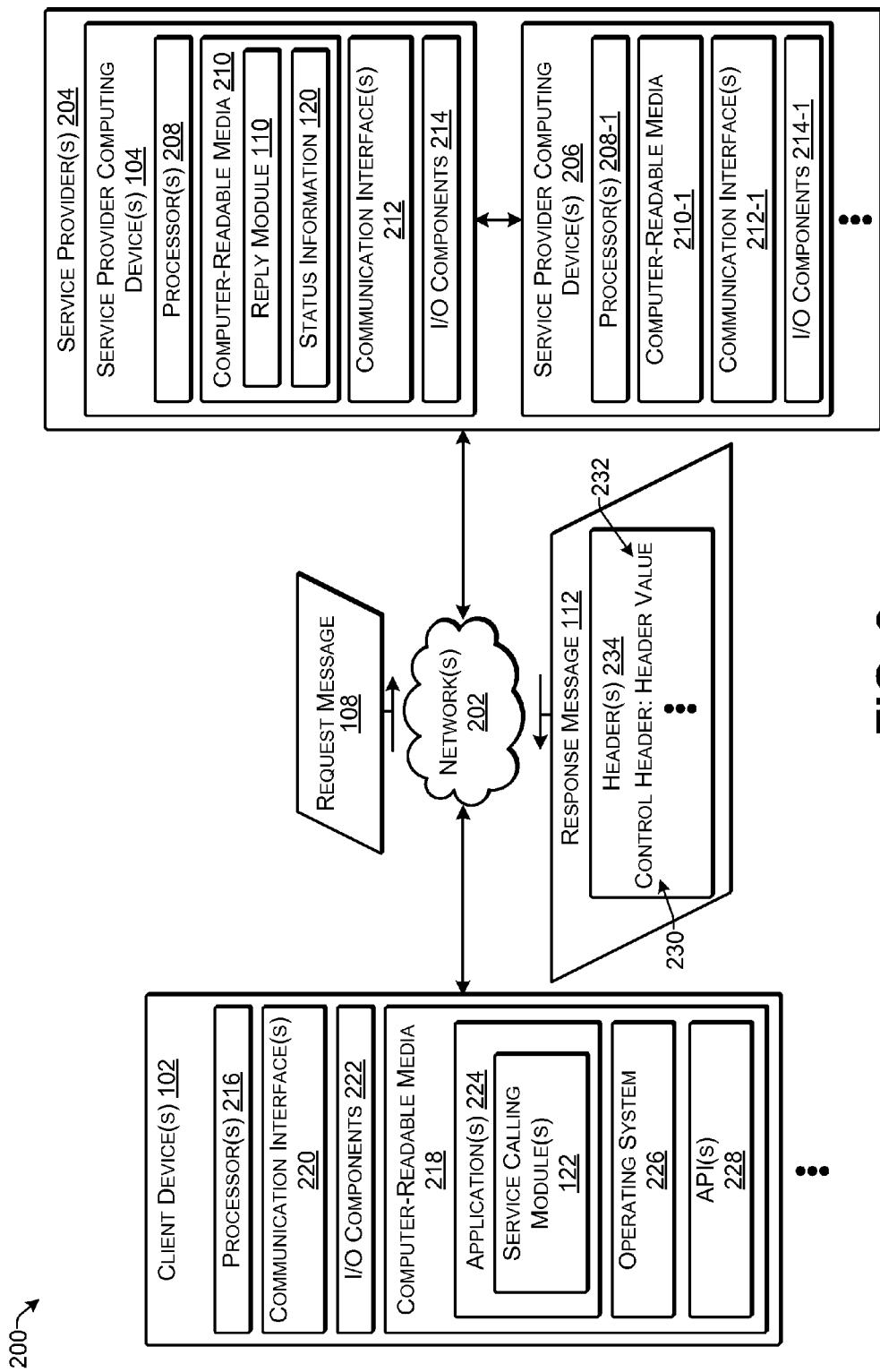
FIG. 2 illustrates an example architecture of a system for controlling requests through message headers according to some implementations.

FIG. 2 illustrates an example architecture of a system 200 including at least one service provider computing device 104 in communication with at least one client device 102 according to some implementations. The service provider computing device 104 is able to communicate with the client device 102 through at least one network 202. For example, the network 202 may include any appropriate network, such as a local area network (LAN), a wide area network (WAN), e.g., the Internet, or any combination thereof, and may include both wired and wireless communication technologies using any suitable protocols and communication techniques. The service provider computing device 104, the client device 102, and the service provider computing device 104 may communicate and interact with one another using any combination of suitable communication and networking protocols, such as Internet protocol (IP), transmission control protocol (TCP), HTTP, and so forth.

In some implementations, the service provider computing device(s) 104 may be provided by one or more service providers 204, and may include one or more servers or other types of computing devices that may be embodied in any number of ways. For instance, in the case of a server, the service provider computing device 104 may be implemented using a single server, a cluster of servers, a server farm or data center, virtual servers, a cloud-hosted computing service, and so forth, although other computer architectures (e.g., a mainframe architecture) may also be used. Further, while the figures illustrate the components of the service provider computing device 104 as being present in a single respective location, it is to be appreciated that these components may be distributed across different computing devices and locations in any manner. For instance, service provider computing device 104 may provide the various functionalities described herein distributed in various ways across different computing devices.

The service provider computing device 104 may be in communication with one or more additional service provider computing devices 206. For example, the service provider computing devices 206 may provide services to the service provider computing device 104 to support one or more services provided by the service providing computing device 104 to the client devices 102. The service provider computing devices(s) 206 may also, or alternatively, provide services directly to the client devices 102. The service provider computing devices 104, 206 may be located together or separately, and organized, for example, as virtual servers, server banks and/or server farms. The described functionality may be provided by the servers of a single entity or enterprise, or may be provided by the servers and/or services of multiple entities or enterprises. Thus, in some examples, the service provider computing devices 206 may communicate with the service provider computing devices 104 and/or the client devices 102 through network(s) 202.

As illustrated in FIG. 2, the service provider computing device 104 includes one or more processors 208, one or more computer-readable media 210, one or more communication interfaces 212, and one or more input/output (I/O) components 214. Similarly, the service provider computing device(s) 206 may include processor(s) 208-1, computer-readable media 210-1, communication interfaces 212-1, and I/O components 214-1.

The processor(s) 208, as well as the other processors described herein, may be a single processing unit or a number of processing units (e.g., CPUs), and may include single or multiple computing units or multiple processing cores. The processor(s) 208 can be configured to fetch and execute computer-readable instructions stored in the computer-readable media 210, such as one or more software modules or components, which may include the reply module 110, for performing the various functions attributed to the service provider computing device(s) 104.

The computer-readable media 210, as well as the other computer-readable media described herein, may include volatile and nonvolatile memory and/or removable and non-removable media implemented in any type of technology for storage of information, such as computer-readable instructions, data structures, program modules, or other data. Such computer-readable media 210 includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device or other processor. Depending on the configuration of the service provider computing device 104, the computer-readable media 210 may be a type of computer-readable storage media and may be a non-transitory storage media.

The communication interface(s) 212, as well as the other communication interfaces described herein, may include one or more interfaces and hardware components for enabling communication with various other devices, such as the client device(s) 102 and/or the service provider computing device 206, over the network(s) 202. For example, communication interface(s) 212 may facilitate communication through one or more of the Internet, cable networks, cellular networks, wireless networks (e.g., Wi-Fi, cellular, near-field) and wired networks. Various different approaches to examples described herein can be implemented in various environments. For instance, the network(s) 202 may include any appropriate network, including an intranet, the Internet, a cellular network, a LAN, WAN, VPN (Virtual Private Network) or any other network or combination thereof. Components used for such a system can depend at least in part upon the type of network and/or environment selected. Components for communicating via such networks are well known and will not be discussed herein in detail.

Service provider computing device may be further equipped with various input/output (I/O) components 214. Such I/O components 214 may include a display, various user interface controls (e.g., buttons, mouse, keyboard, touch screen, etc.), audio speakers, connection ports and so forth.

The computer-readable media 210 may be used to maintain any number of functional components that are executable by the processors 210. In many implementations, these functional components comprise instructions or programs that are executable by the processors 210 and, when executed, implement operational logic for performing the actions attributed to the service provider computing devices 104, 206. An example functional component of the service provider computing device 104 that may be executed on the processor(s) 208 for implementing the various functions and features related to providing control headers, as described herein, includes the reply module 110, as well as various other modules, components, software and code, as described in the various implementations herein. Additional functional components stored in the computer-readable media 210 that are not shown in FIG. 2 may include one or more operating systems for controlling and managing various functions of the service provider computing device 104.

In addition, the computer-readable media 210 may include, or the service provider computing device 104 may access data used by the various components and modules, as described herein, such as status information 120. The service provider computing device 104 may also include many other logical, programmatic and physical components, of which those described above are merely select examples that are related to the discussion herein. Further, in some examples, the service provider computing device(s) 206 may be configured similarly to the service providing computing device(s) 104 described above, but with some different functional components and data, depending on the intended use and purpose. Additionally, in some implementations, the service provider computing devices 104, 206 can correspond to different nodes on the network(s) 202 and may also correspond to different points of presence on the network(s) 202.

The system 200 further includes the one or more client devices 102 that may communicate with the service provider computing devices 104 and/or 206. As mentioned above, the client devices 102 may correspond to a wide variety of computing devices. Thus, the client devices 102 may have varied local computing resources, such as central processing units or other processor architectures, memory or mass storage (collectively included in computer-readable media), graphics processing units, communication network availability and bandwidth, and so forth. In the illustrated example, the client device 102 may include one or more processors 216, computer readable media 218, communication interfaces 220, and I/O components 222. The processor(s) 216 may be any suitable processor, CPU, or the like, for executing computer-readable instructions. The communication interface(s) 220 may support communication over the network(s) 202. For example, the client devices 102 may include hardware and software components for establishing communications over the network(s) 202 with service provider computing devices 104 and/or 206. Thus, the client devices 102 may be equipped with networking equipment that facilitates communications over the Internet, an intranet, LAN, WAN, or so forth, using wired and/or wireless technologies.

In some examples, the computer-readable media 218 may embody any of the examples of the computer-readable media 210 described above, but may include different functional components and data. In the illustrated example, the computer readable media 218 may include one or more applications 224 and an operating system 226. The application(s) 234 may include a browser application, or other applications, such as a mobile application, an online application, or the like, able to communicate with the service provider computing devices 104 and/or 206. For example, the application 224 and/or the operating system 226 may include a service calling module 122, as described above (shown with the application 224 in this example), that sends the request message 108 to the service provider 204. In some cases, the service calling module 122 may invoke, implement or use an API provided by the application 224 or the operating system 226, while in other cases, the service calling module 122 may be other software that sends the request message 108. Still alternatively, the service calling module 122 may initiate, control, or utilize one or more APIs 228. For example, the computer readable media 218 may include one or more APIs 228 that may be independent of the application(s) 224 and which may be used to generate calls to the service provider(s) 204 based on various conditions, triggers, user actions, application instructions, and so forth. Further, the client device 102 may include various other hardware and software components not illustrated in FIG. 2, depending on the configuration, type and intended use of the client device 102.

The I/O components 222 included with the client device 102 may include a display for displaying interfaces and content to a user, as well as various controls and input devices, such as a virtual or physical keyboard, a mouse, a pointing stick, a touchpad, a trackball, a joystick, a remote control, buttons, accelerometer, gyroscope, compass, Global Positioning System device and/or various other controls for performing desired inputs and interactions with the client device 102.

The client device 102 may send one or more request messages 108 to one or more of the service provider computing devices 104 or 206. For example, the request message 108 may include a request for data or other information. Alternatively, the request message 108 may provide data or information to the service provider 204.

As an example, suppose that the service provider desires to slow or throttle network traffic to the service provider computing device 104 due to a current heavy call volume. For example, the reply module 110 on the service provider computing device 104 may refer to status information 120 and determine that throttling of calls to the service provider computing device 104 should take place. As one example, a large number of client devices 102 may each send multiple request messages 108 in close succession. Accordingly, in the response messages 112 provided to the client devices 102 in reply to the request messages 108, the reply module 110 may include a control header 230. The control header 230 may include a header value 232 in a field of the control header 230 as header information. Thus, the control header 230 may be included with any other headers 234 provided with the response message 112.

Upon receiving the response message 112 and interpreting the header value 232 of the control header 230, the API 228 or service calling module 122 that receives the response message 112 and interprets the control header 230 may perform one or more operations to comply with the control header 230. For example, the control header 230 may instruct or otherwise inform the API 228, service calling module 122, application 224 and/or operating system 226 to wait according to a specified time limit before sending a subsequent request message to the service provider computing device 104. For instance, the service calling module 122 may include code or other executable instructions to cause the service calling module 122 to wait for a specified period of time in response to the receipt of the control header 230. Similarly, if the API 228 is used to issue the request message 108, the API 228 may include provisions for refraining from sending any additional request messages following the receipt of the control header 230 in response to the request message 108. As mentioned above, the header value 232 may be any of several different values. For example, the header value 232 may be a number of seconds, minutes, days, or so forth that the client device 102 should wait before issuing a subsequent request message. Alternatively, the header value 232 may specify a particular time (and optionally a date) until which the client device 102 should wait before issuing a subsequent request message 108.

Accordingly, the service provider computing device 104 may employ the control headers 230 to effectively limit or throttle the frequency of request messages from the client devices 102 under various contingencies such as when under a high load, or the like. This can ensure a better overall user experience, as service outages may be prevented. Further, throttling of unnecessary calls by a client device 102 to the service provider 204 can save battery life and/or improve overall performance of certain client devices 102. In addition, when the status information 120 indicates that there is sufficient capacity on the service provider computing devices 104, 206, the message throttling rates may be reduced. Additionally, the illustrated system 200 is merely one example provided for discussion purposes, and numerous other variations will be apparent to those of skill in the art in light of the disclosure herein.

Figure 3:
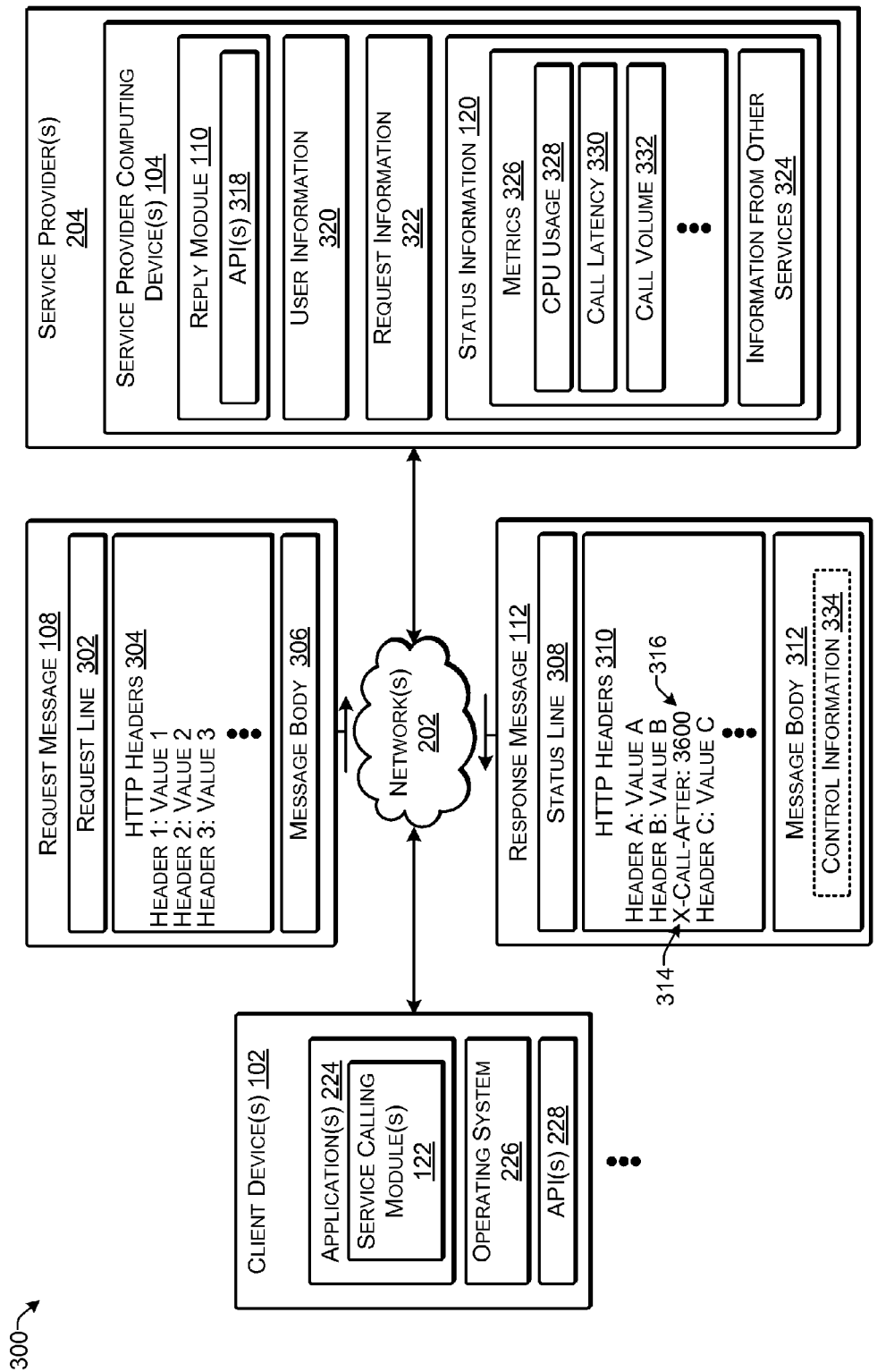
FIG. 3 illustrates an example of controlling requests through message headers according to some implementations.

FIG. 3 illustrates an example of controlling requests through message headers according to some implementations. For instance, in this example, the control header may be a Hypertext Transfer Protocol (HTTP) header. HTTP is one example of a suitable network messaging protocol used to deliver resources such as HTML (Hypertext Markup Language) files, image files, search query results, and numerous other types of data, files, content, and so forth. Similar to many network protocols, HTTP uses a client-server model in which an HTTP client opens a connection and sends a request message to an HTTP server; the server then returns a response message, which may or may not contain a requested resource.

HTTP messaging may be carried out through TCP/IP sockets or the like. The formats of both the request and response messages are similar. Both kinds of messages consist of an initial line, zero or more header lines, a blank line (i.e., a CR-LF (carriage return-line feed) by itself), and an optional message body (e.g., a resource or resource portion). HTTP includes a plurality of standard headers for request messages and response messages. HTTP also allows the use of non-standard header fields, which are conventionally marked by prefixing the field name with an "X-."

In the illustrated example of FIG. 3, the client device 102 may send the request message 108 to the service provider computing device 104. The request message 108 may include a request line 302, and zero or more HTTP headers 304, such as header 1, having a value 1, header 2, having a value 2, header 3, having a value 3, and so forth. Optionally, the request message 108 may include a message body 306, which may be a payload or data included with the request message 108. In some examples, the message body 306 included with the request message 108 may provide information to the service provider computing device 104, such as annotations or highlights made to a digital work on the client device 102, logs collected by the client device and communicated to the service provider 204, and/or other information that is provided by the client device 102 to the service provider 204. In other examples, however, no message body 306 is provided with the request message 108.

The request message 108 may be received by the service provider computing device 104. The received request message 108 may be serviced by the reply module 110 to provide the response message 112. In this example, the response message 112 includes a status line 308, one or more HTTP headers 310, and a message body 312. In some examples, the message body 312 may include data or other information requested by the request message 108. However, in other examples, there may be no message body 312, depending on the nature of the request message 108.

The HTTP headers 310 may include a control header 314 having a conventional HTTP non-standard header format that includes an "X-" to indicate that the header is a custom or non-standard header. In this example, the control header 314 is entitled "X-Call-After," which is descriptive of the use of the header 314. However, the control header 314 may be given any name so long as the software operating on the client device 102 that receives or reads the control header 314 is able to recognize the name and respond in the manner described herein. The control header 314 also includes a header value 316, which in this example is 3600 to represent a number of seconds (i.e., one hour) that the header 314 is instructing, requesting or otherwise informing the client device 102 to wait before sending a subsequent request message 108. Accordingly, as one example, the header value 316 may be an integer number of seconds (e.g., in decimal) after the time of the response. Alternatively, the control header value 316 may specify a time, such as a 10:00 a.m., after which the client device 102 may submit another request message 108. Thus, as another example, the control header value may be an HTTP-date value. Still alternatively, the control header value may be the word "never" or a similar value to indicate that the client device should not submit another request message 108. For example, the "never" header value may be used to turn off or deactivate a particular feature on the client device, such as a particular service calling module or particular API. The HTTP headers 310 may further include other headers such as header A, having a value A, header B, having a value B, header C, having a value C, and so forth.

In this example, the reply module 110 may include at least one API 318 that may be the target of the request message 108. The API 318 may be used to provide the response message 112 to an API 228 that was used to generate the request message 108. The reply module 110 may further obtain or access user information 320, request information 322, the status information 120 and information from other services 324 when determining an amount or degree of message throttling to apply to the client device 102 or to a particular API 228, service calling module 122, application 224, etc. Accordingly, in some implementations, the reply module 110 may take into consideration a number of different parameters, metrics, or other considerations, when determining dynamically an amount of throttling to apply to a particular client device 102 or a particular API 228 on the client device 102.

In some examples, the user information 320 may indicate that a particular user, or an associated client device 102, is entitled to less message throttling than other users. Thus, some users may be premium users while other users may be general users. For instance, the premium users may be identified based on the user information 320, which may be obtained from the request message 108. Thus, premium users may be given preferential messaging with lower throttling rates than the general users. Premium users may be differentiated from general users based on any number of factors such as payment of a fee to become premium users, purchasing a more expensive version of the device 102, or so forth.

Furthermore, the request information 322 may also be used for determining an amount of throttling to be applied by the control header 314. For example, the message body 306 or one of the headers 304 may include a reason that the client device is calling the service provider. For example, the service provider may determine a throttling rate (e.g., an amount of time that the particular client device should wait before the next request message is permitted) based at least in part on the reason that the client device is calling. As another example, if a particular type of call from the client device 102 typically results in an immediate redundant second call, the second call may be delayed or instructed not to happen.

Further, in some instances, a priority hierarchy may be established for various calls and types of calls. For example, user-generated calls may be given a higher priority than device generated calls. Thus, if a first request message 108 is received with information that indicates the type of call is typically followed by a user-generated request message 108, the amount of throttling for the subsequent call may be less than if the type of call is typically followed by a device generated call, a redundant call, or the like. Other types of hierarchies may also be established. Additionally, rather than inferring the priority based on the reason for or the type of the request provided in the message, the client device 102 itself may include with the message a priority of a current request or an expected next request.

In addition, the request information 322 may include a network characteristic, such as type of network used for sending or passing the request message 108. For example, users of a Wi-Fi or wired network may be throttled at a lower rate than users of a cellular or other more costly wireless network. Accordingly, the request information 322 may indicate one or more characteristics of a network 202 over which the request message 108 and/or the reply message 112 is sent, and may determine a desired or appropriate throttling rate based on the one or more identified characteristics of the network 202.

The status information 120 may include one or more metrics 326 relating to the service provider computing devices 104. For example, the metrics 326 may include CPU usage 328, call latency 330, call volume 332 and so forth. The metrics 326 may relate to a single service provider computing device 104, or to a group or plurality of service provider computing devices 104. For example, when determining a length of time to request that a client device wait before sending a subsequent request message, the reply module 110 may take into account one or more of the metrics 326 as well as the user information 320 the request information 322 and information from other services 324. For instance, the information from other services 324 may include metrics corresponding to one or more additional service provider computing devices 206, as discussed above. Thus, if the service provider computing device 104 is dependent on one or more services provided by the service provider computing devices 206 to provide a service to the client devices 102, the service provider computing device 104 may take into account a load on the service provider computing devices 206 when determining the amount of message throttling to apply to the client devices 102.

In addition, the user information 320 may include, for each client device and/or for each client device service calling module 122 or particular API 228 that has been provided with a response message, an expected time at which the client device/module/API will next call back to the service provider computing device 104. Should the client device/module/API not honor the throttling instructions, such as due to malfunction or intentional modification of the client device 102 by a user, this may be noted by the reply module 110. Accordingly, failure by a particular client device 102 to abide by the control header information may result in repair of software on the client device 102, such as by reloading a malfunctioning portion of the software, refusal of service to the particular client device 102, blacklisting of the particular client device 102, or the like.

In addition, or alternatively, the response message 112 may include control information 334 in the message body 312 to limit subsequent request messages 108 sent by a particular service calling module 122, API 228, application 224, operating system 226, or the like. For example, the response message may include a message body, which may include information such as data, text, instructions or the like. Accordingly, as an alternative to, or in addition to, including the control header 314 in the response message 112, the response message may include the control information 334 that instructs, requests, or otherwise informs the client device 102 to wait before sending a subsequent request message. Thus, the control information 334 may include a specified time, a specified length of time, or "never" as a control value for informing the client device or a particular application, service calling module and/or API on the client device 102 to wait before sending a subsequent request message. As one non-limiting example, the message body may include XML (extensible markup language) text, and the XML text may include information to inform a particular service calling module of a time limit to wait before sending a subsequent request message. Numerous other variations will be apparent to those of skill in the art in view of the disclosure herein.

Figure 4:
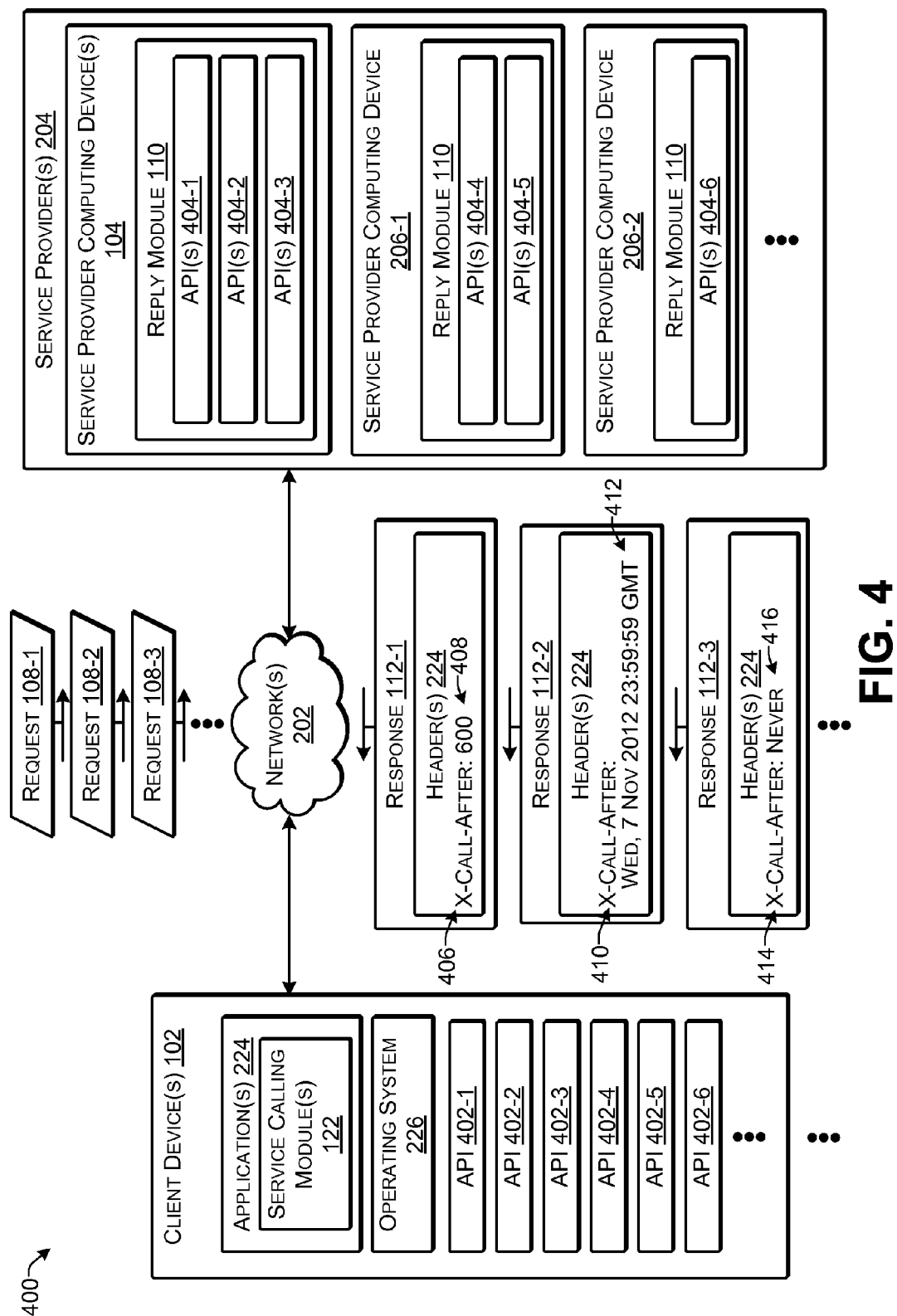
FIG. 4 illustrates an example of controlling multiple requests through multiple message headers in multiple messages according to some implementations.

FIG. 4 illustrates an example 400 of controlling multiple requests through multiple message headers in multiple messages according to some implementations. In the example of FIG. 4, the client device 102 has a plurality of APIs 402 including APIs 402-1 through 402-6. For example, each API on the client device 102 may be used to make a call by sending a message request 108 to a corresponding respective API 404 of the service provider(s) 204. Thus, service provider computing device 104 may include APIs 404-1, 404-2 and 404-3, which may be used to interact with APIs 402-1 through 402-3, respectively, on the client device 102. Further, another service provider computing device 206-1 may include APIs 404-4 and 404-5, which may be used to interact with APIs 402-4 and 402-5, respectively, on the client device 102. An additional service provider computing device 206-2 may include API 404-6, which may be used interact with API 402-6 on the client device 102.

Each API 402 on the client device 102 may be used to send a request message 108 to a respective service provider computing device 104 or 206 to perform various functions of the client device 102. For example, API 402-1 may be used to send a request message 108-1 to the API 404-1; API 402-2 may be used to send a request message 108-2 to the API 404-2; API 402-3 may be used to send a request message 108-3 to the API 404-3, and so forth. In the illustrated example, the service provider computing devices 104 and/or 206 may perform message throttling on an individual API basis. Accordingly, based at least in part on the parameters and considerations discussed above, such as the user information 320, request information 322, status information 120 and information from other services 324, each API 404 or a reply module 110 associated with each particular API 404, may independently determine an amount of throttling to apply to a respective API 402 on the client device 102. Alternatively, the reply module 110 may determine a time limit to be applied for throttling one or more or all of the APIs 402.

As an example, the reply module 110 may use the API 404-1 to send a response message 112-1 in response to the request 108-1 that includes a control header 406 with a control header value 408 having a value of "600." Thus, the control header 406 informs a service calling module 122 associated with the API 402-1 on the client device 102 to wait 10 minutes (600 seconds) before issuing a subsequent request message. Similarly, the reply module 110 may use the API 404-2 to issue a response message 112-2 in response to the request 108-2 that includes a control header 410 with a control header value 412 having a value of "Wed, 7 Nov. 2012 23:59:59 GMT." Thus, the control header 410 informs a service calling module 122 associated with the API 402-2 on the client device 102 to wait until a specific date and time arrives before issuing a subsequent request message. For example, the specific date and time specified in the header value 412 may be only several minutes in advance of the current time, or may be a number of hours, days, weeks, or more, in advance of the current time. Further, implementations herein are not limited to any particular format for specifying a date, time, amount of time, or combinations thereof.

Similarly, the reply module 110 may use the API 404-3 to issue a response message 112-3 in response to the request 108-3 that includes a control header 414 with a control header value 416 having a value of "Never." The control header value 416 may be the word "never" in text form, or any term or symbol having a similar meaning to inform a target to not issue a subsequent request message. Thus, the control header 414 may informs a service calling module 122 associated with the API 402-3 on the client device 102 to never issue a subsequent request message to the API 404-3. For example, the API 402-3 and/or the associated service calling module 122 may be for a feature that is being turned off or deactivated on the client device 102, or which for some other reason may be desired to no longer be used. The other APIs 404-4 through 404-6 may be used to issue similar responses to the respective APIs 402-4 through 402-6 on the client device 102 to individually control or throttle the request messages issued by each of those APIs. In some examples, each individual API 402 may self-enforce the instructed throttling limits provided for that API 402. Alternatively, in other examples, the operating system 226, the service calling module(s) 122 and/or the application(s) 224 may enforce the instructed message throttling limits with respect to the APIs 402.

Figure 5:
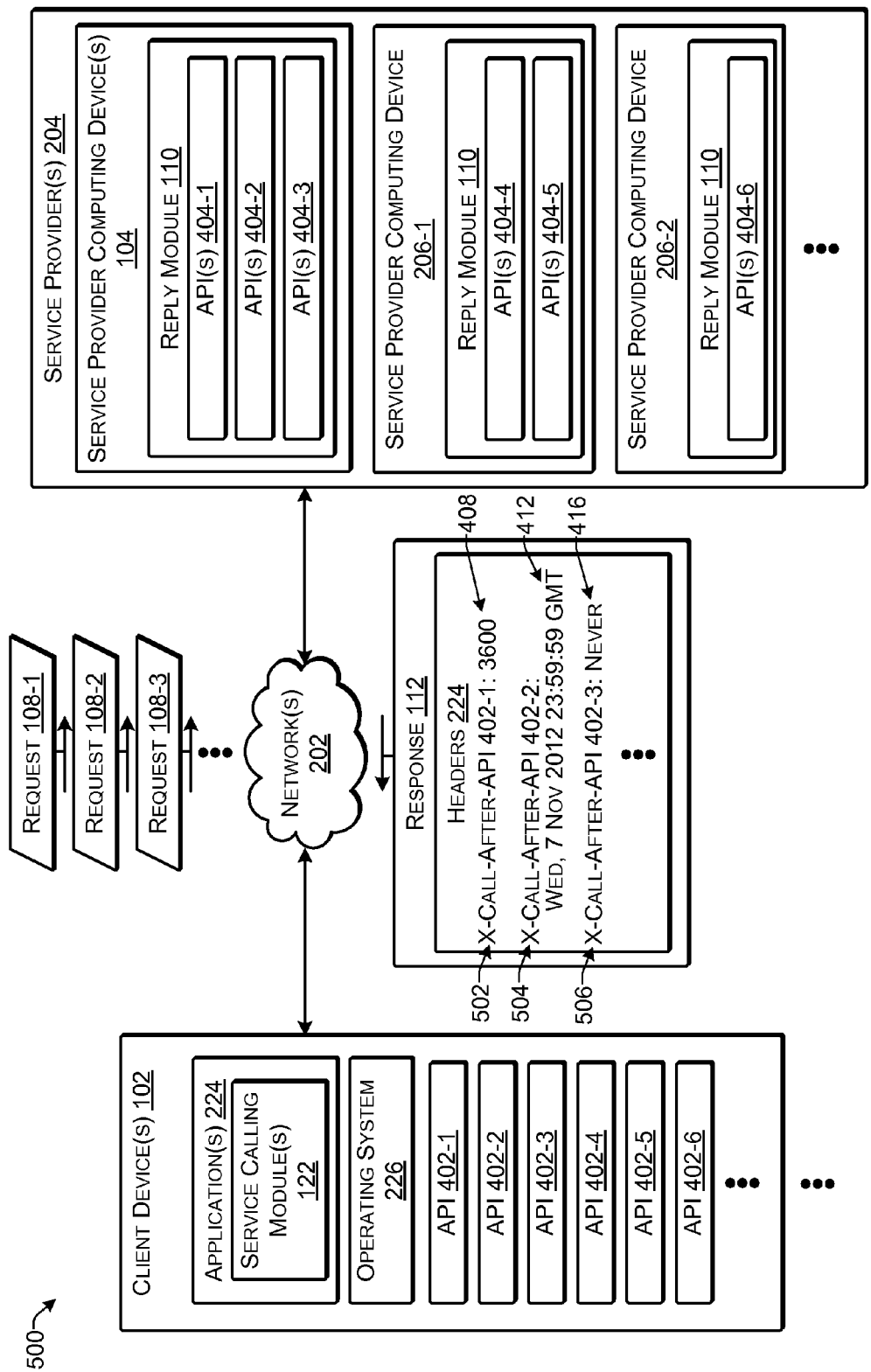
FIG. 5 illustrates an example of controlling multiple requests through multiple message headers in a single message according to some implementations.

FIG. 5 illustrates an example 500 of controlling multiple requests through multiple message headers in a single response message 112 according to some implementations. In the example of FIG. 5, the client device 102 has the plurality of APIs 402 including APIs 402-1 through 402-6, as described above with respect to FIG. 4. Furthermore, the service provider computing devices 104, 206-1 and 206-2 have the APIs 404-1 through 404-6, as described above with respect to FIG. 4. The APIs 402 may be used to send individual requests 108-1, 108-2, etc., as described above. In response, one or more of the service provider computing devices 104, 206-1, 206-2 may send a response message 112 that includes multiple control headers to throttle some or all of the APIs or associated service calling modules 122 on the client device 102. For example, the service provider computing device 104 may send a response message 112 that includes, in a single response message 112, the control headers 502, 504, 506, which may correspond to the control headers 406, 410 and 414, respectively. However, in this example, each of the control headers 502, 504, 506 may include a designation of the particular API to which the control header time limitation applies. For example, the control header 502 may include a designation of API 402-1 in the header name, e.g., "X-Call-After-API-402-1:". Similarly, the control header 504 may include a designation of API 402-2 in the header name e.g., "X-Call-After-API-402-2:", and so forth. As an alternative, the header name may designate more than one API 402 in the header name to which the particular time limitation may be applied. As still another alternative, the one or more APIs may be identified in the header values 408, 412, 416. Accordingly, the control headers 502, 504, 506 may identify a subset of APIs on the client device 102. As yet another alternative, the header name or the header value may designate all the APIs 402 on the client device 102, such as by "X-Call-After-API-All:". As still another alternative, rather than identifying particular APIs, the control header values may identify particular service calling modules, particular applications, particular application features, client device features, and the like. Other variations will also be apparent to those of skill in the art in view the disclosure herein.

In addition, in some examples, the service provider computing devices 104, 206 may send a response message 112 that includes control headers for some or all of the APIs 402, even when one or more of the APIs 402 has not been used to send a request message 108. For example, the reply module 110 on the service provider computing device 104 may have information regarding which APIs 402 are contained on the client device 102, such as through user information 320, and may proactively throttle those APIs 402 and associated service calling modules 122 in response to receiving a request message 108 from any one of the APIs 402 on the client device 102. For example, the service provider computing device 104 may have knowledge of the functions of all of the APIs 402 and service calling modules 122 contained on the client device 102 and may provide various different appropriate control headers and time limits for each of the APIs 402 and service calling modules 122 on the client device 102. In some examples, each individual API 402 may self-enforce the instructed throttling limits. Alternatively, in other examples, the operating system 226, the service calling module(s) 122 and/or the application(s) 224 may enforce the instructed message throttling limits. Furthermore, while several illustrative examples have been discussed herein, numerous other variations will be apparent to those of skill in the art having the benefit of this disclosure.

Example Processes

Figure 6:
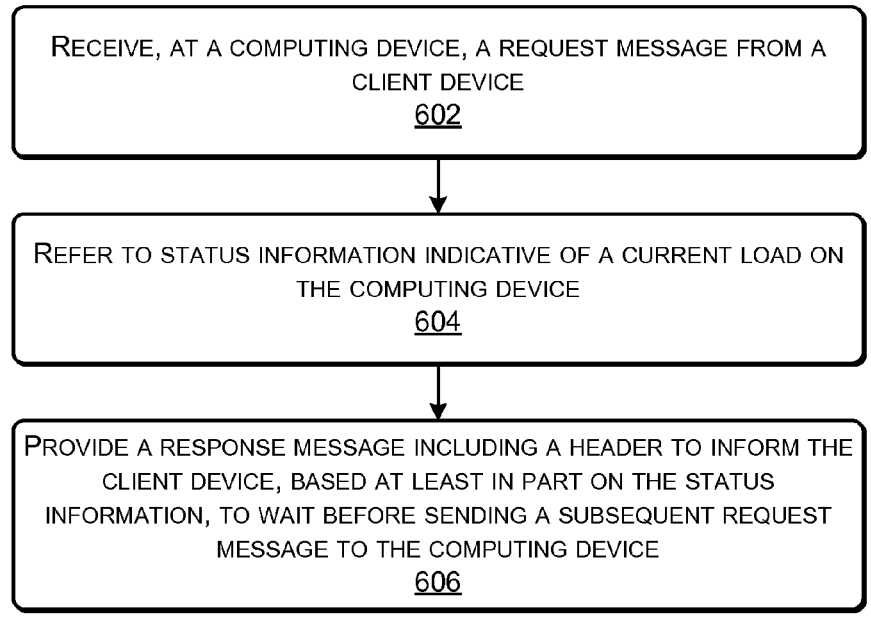
FIG. 6 is a flow diagram illustrating an example process for controlling requests through message headers executed by a computing device according to some implementations.
Figure 7:
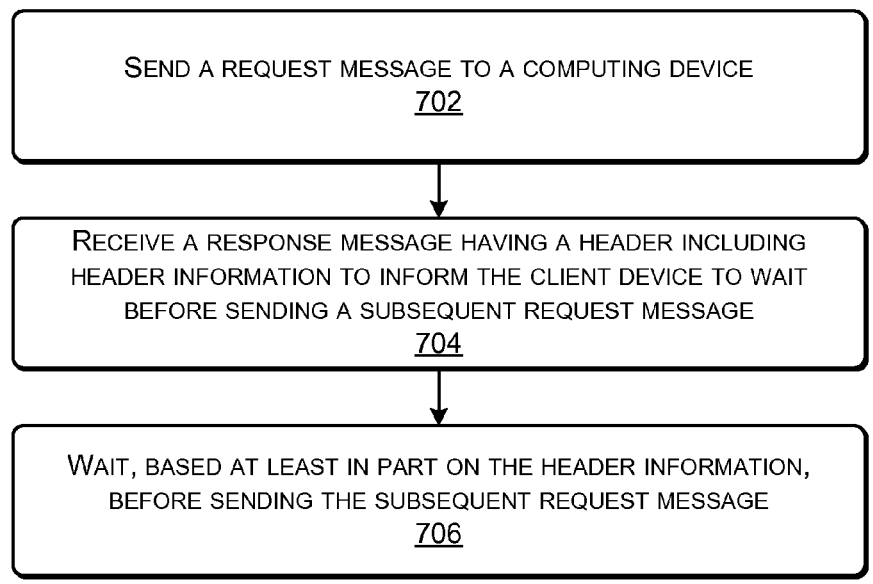
FIG. 7 is a flow diagram illustrating an example process for controlling requests through message headers executed by a client device according to some implementations.

FIGS. 6-8 illustrate example processes for implementing the techniques described above for using headers to control messaging. These processes are illustrated as a collection of blocks in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures, frameworks and environments described in the examples herein, although the processes may be implemented in a wide variety of other architectures, frameworks or environments.

FIG. 6 is a flow diagram illustrating an example process 600 that may be executed by the service provider computing device 104 for controlling requests using message headers according to some implementations.

At 602, the computing device receives a request message from a client device. For example, the computing device may receive a request message sent using an API or through other software executable on the client device. In some cases, the request message may be an HTTP message.

At 604, the computing device refers to status information indicative of a current load on the computing device, or various other types of information. For example, the computing device may refer to various metrics indicative of a load on the computing device or a group of computing devices with which the computing device is associated. The metrics may include CPU usage, call response latency, call volume, or any of various other metrics that may indicate an amount of traffic or processing load currently being handled by the computing device or the group of computing devices associated with the computing device. Various other parameters may be considered when determining a time limit for throttling messages from a client device, such as a type or class of the client device, a type of message, a reason for the message, a priority of a user associated with the client device or of the client device itself, a network type used for communicating with the client device, a type of content requested by the message, and so forth.

At 606, the computing device provides a response message including a header to instruct or inform the client device to wait before sending a subsequent request message to the computing device. For example, the message header may include header information that informs the client device to wait for at least one of a specified length of time or until a specified time before sending a subsequent request message to the computing device. As a particular example of a specified length of time, the message header may instruct the client device to never send a subsequent request message, such as for deactivating a particular feature on the client device. The time limit determined to be applied to the client device may be determined dynamically by the computing device based, at least in part on the status information or any of the other parameters or metrics referred to at 604. In some examples, the response message may be an HTTP message and the header may be a non-standard HTTP header.

FIG. 7 is a flow diagram illustrating an example process 700 that may be executed by the client device for controlling requests through message headers according to some implementations.

At 702, the client device may send a request message to a computing device. For example, the client device may send the request message to a service provider computing device that may provide one or more services to the client device. In some cases, an API on the client device may be used to send the request message in response to various triggers, conditions, inputs or the like.

At 704, the client device receives a response message in response to the request message. The response message may include a header having header information to instruct or inform the client device to wait before sending a subsequent request message. For example, the header may provide a time limit for the client device to wait before sending the subsequent request message.

At 706, the client device waits based, at least in part, on the header information before sending the subsequent request message. For example, the client device may wait for the specified time limit, as enforced by software present on the client device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

The invention claimed is:
1. One or more non-transitory computer-readable media maintaining instructions executable by a processor of a computing device to perform operations comprising:
    receiving, by the computing device, a hypertext transfer protocol (HTTP) request message from an application programming interface (API) used by a module executed on a client device;

receiving status information indicative of a current load on at least one of the computing device or another computing device, the status information including at least one of central processing unit (CPU) usage, call volume, or response latency; and providing an HTTP response message to the client device in reply to the request message, the HTTP response message including an HTTP header, based at least in part on the status information, to inform the module to wait before using the API to send a subsequent request message to the computing device.

2. The one or more non-transitory computer-readable media as recited in claim 1, wherein the HTTP header is formatted as a non-standard HTTP header.

3. The one or more non-transitory computer-readable media as recited in claim 1, wherein the HTTP header informs the module on the client device to wait for a specified length of time before sending a subsequent request message to the computing device.

4. The one or more non-transitory computer-readable media as recited in claim 1, wherein the HTTP header informs the module on the client device to wait until after a specified time before sending a subsequent request message to the computing device.

5. The one or more non-transitory computer-readable media as recited in claim 1, wherein the HTTP header informs the module on the client device to not send a subsequent request message to the computing device.

6. A method comprising:

under control of one or more processors of a computing device, in response to receiving a request message through an application programming interface (API) implemented on a client device, sending a response message to the client device, the response message including a header to inform the client device to wait before using the API to send a subsequent request message to the computing device.

7. The method as recited in claim 6, wherein the header informs the client device to wait for at least one of a specified time or a length of time determined based, at least in part, on status information related to a load on at least one of the computing device or one or more computing devices that provide a service to the computing device.

8. The method as recited in claim 6, wherein the header instructs the client device to wait for at least one of a specified time or a length of time determined based, at least in part, on information related to at least one of the client device or a user associated with the client device.

9. The method as recited in claim 6, wherein the header instructs the client device to wait for at least one of a specified time or a length of time determined based, at least in part, on a type of a service request associated with the request message.

10. The method as recited in claim 6, wherein the header instructs the client device to wait for at least one of a specified time or a length of time determined based, at least in part, on a load on one or more service providing computing devices that provide one or more services to the computing device.

11. The method as recited in claim 6, wherein the header instructs the client device to wait for at least one of a specified time or a length of time determined based, at least in part, on a characteristic of a network over which the request message is transmitted.

12. The method as recited in claim 6, wherein the header instructs the client device to wait for at least one of a specified time or a length of time determined based, at least in part, on a reason for the request message provided with the request message.

13. The method as recited in claim 6, wherein the header is formatted as a non-standard hypertext transfer protocol (HTTP) header.

14. The method as recited in claim 6, wherein the response message includes a plurality of headers to request that a plurality of respective APIs and corresponding modules executable on the client device wait before sending respective request messages to the computing device.

15. The method as recited in claim 6, wherein the header informs a particular module on the client device to never send a subsequent request message to deactivate a feature corresponding to the particular module on the client device.

16. A device comprising:

a processor;

a computer readable medium coupled to the processor; and a service calling module, using one or more application programming interfaces (APIs), maintained on the computer-readable medium and executed on the processor to:

send a request message to a computing device;

receive a response message from the computing device, the response message having a header, the header including header information to inform the service calling module to wait before sending a subsequent request message to the computing device using at least one of the one or more APIs; and waiting, based at least in part on the header information, before sending the subsequent request message to the computing device.

17. The device as recited in claim 16, wherein:

the response message includes a plurality of the headers, each instructing the service calling module corresponding to a different API of the one or more APIs to wait before sending a respective request message using a respective API.

18. The device as recited in claim 16, wherein the header information includes a header value corresponding to at least one of:

a specified time;

a specified amount of time; or never send a subsequent request message.

19. The device as recited in claim 16, wherein the service calling module is implemented by an application executable on the device.

20. The device as recited in claim 16, wherein the service calling module is implemented by an operating system executable on the device.

21. A computing device comprising:

one or more processors;

a computer-readable medium coupled to the one or more processors;

a module maintained on the computer-readable medium and executed on the one or more processors to perform operations including:

receiving a request message from a client device;

sending a response message to the client device, the response message including information informing the client device to wait before sending a subsequent request message, wherein the information is to inform a particular service calling module executed on the client device that used a particular application programming interface (API) to send the request message to wait before sending the subsequent request message using the API.

22. The computing device as recited in claim 21, wherein the information is included in a header of the response message.

23. The computing device as recited in claim 21, wherein the information is included in a message body of the response message.

24. The computing device as recited in claim 21, wherein the information is to inform a plurality of service calling modules corresponding to a plurality of respective application programming interfaces to wait before sending the subsequent request message.

25. The computing device as recited in claim 21, wherein the information is to inform a particular service calling module executed on the client device to never send a subsequent request message to deactivate the particular service calling module on the client device.

* * * * *